(12) United States Patent
Srinivasan et al.

(10) Patent No.: US 11,645,348 B2
(45) Date of Patent: May 9, 2023

(54) CROWDSOURCED REFINEMENT OF RESPONSES TO NETWORK QUERIES

(71) Applicant: INTERNATIONAL BUSINESS MACHINES CORPORATION, Armonk, NY (US)

(72) Inventors: SathyaNarayanan Srinivasan, Austin, TX (US); Ishwarya Rajendrababu, Hoboken, NJ (US); Paul R. Bastide, Ashland, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 16/823,225

(22) Filed: Mar. 18, 2020

(65) Prior Publication Data
US 2021/0294866 A1 Sep. 23, 2021

(51) Int. Cl.
*G06F 16/00* (2019.01)
*G06F 16/9536* (2019.01)
*G06F 16/9538* (2019.01)
*G06F 16/9532* (2019.01)

(52) U.S. Cl.
CPC ...... *G06F 16/9536* (2019.01); *G06F 16/9532* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 8,700,624 B1 | 4/2014 | Pragada et al. | |
| 8,949,250 B1 * | 2/2015 | Garg | G06F 16/332 707/751 |
| 9,280,610 B2 * | 3/2016 | Gruber | G06F 16/9535 |
| 9,288,279 B2 | 3/2016 | Ban | |
| 9,720,964 B1 | 8/2017 | Hansen et al. | |
| 9,996,616 B2 * | 6/2018 | Grant | G06F 16/9535 |
| 10,268,344 B2 | 4/2019 | Ban | |
| 10,430,829 B2 * | 10/2019 | Gould | G06Q 30/0282 |
| 2006/0038015 A1 | 2/2006 | Ise et al. | |
| 2008/0275767 A1 | 11/2008 | Rafie | |
| 2009/0100020 A1 | 4/2009 | Reddy et al. | |
| 2010/0241597 A1 | 9/2010 | Chen et al. | |

(Continued)

OTHER PUBLICATIONS

Crowdsourcing Predictors of Behavioral Outcomes, Bongard et al., (Year: 2007).*

(Continued)

*Primary Examiner* — Jean M Corrielus
(74) *Attorney, Agent, or Firm* — Cuenot, Forsythe & Kim, LLC (57) ABSTRACT

Providing a crowdsourced refinement of a response to a network query can include detecting an insufficient answer to a query posed by a user seeking information from a plurality of networked sources communicatively coupled with an electronic communications network. Demographic data corresponding to the user can be determined and a search initiated. The search is for a crowdsourced response to the query posed by the user. The search can be conducted over the electronic communications network and can be based on the demographic data corresponding to the user.

17 Claims, 6 Drawing Sheets

(56) References Cited

U.S. PATENT DOCUMENTS

| | | | | |
|---|---|---|---|---|
| 2010/0318507 A1* | 12/2010 | Grant | ............... | G06Q 30/0277 |
| | | | | 707/706 |
| 2013/0304758 A1* | 11/2013 | Gruber | ............... | G06F 16/248 |
| | | | | 707/769 |
| 2013/0339091 A1 | 12/2013 | Humay | | |
| 2014/0149399 A1 | 5/2014 | Kurzion | | |
| 2015/0161632 A1 | 6/2015 | Humay | | |
| 2015/0213061 A1 | 7/2015 | Dhua et al. | | |
| 2016/0055160 A1* | 2/2016 | Himel | ............... | G06F 16/248 |
| | | | | 707/728 |
| 2016/0188738 A1 | 6/2016 | Gruber et al. | | |
| 2017/0098286 A1* | 4/2017 | Gould | ............... | G06Q 50/14 |
| 2019/0026285 A1* | 1/2019 | Himel | ............... | G06F 16/9024 |
| 2019/0164182 A1 | 5/2019 | Abdullah et al. | | |
| 2019/0287135 A1* | 9/2019 | Gould | ............... | G06F 16/24 |

OTHER PUBLICATIONS

"Panopticlick 3.0," [online] The Electronic Frontier Foundation [retrieved Mar. 18, 2020], retrieved from the Internet: <https://panopticlick.eff.org/>, 2 pg.

"Velocity Search UI," [online] Solr Ref. Guide 6.6, Apache Software Foundation © 2017, Site version 6.6, Jun. 9, 2017, retrieved from the Internet: <https://lucene.apache.org/solr/guide/6_6/velocity-search-ui.html>, 3 pg.

Wexler, J., "Facets: An Open Source Visualization Tool for Machine Learning Training Data," [online] Google AI, Jul. 17, 2017, , retrieved from the Internet: <https://ai.googleblog.com/2017/07/facets-open-source-visualization-tool.html>, 8 pg.

Eckersley, P., "How Unique is Your Web Browser?" In Int'l. Sym. on Privacy Enhancing Technologies Symposium, Jul. 21, 2010, pp. 1-18. Springer, Berlin, Heidelberg.

"Device Fingerprinting," [online] Wikipedia, Mar. 17, 2020, retrieved from the Internet: <https://en.wikipedia.org/wiki/Device_fingerprint>, 10 pg.

"My brower fingerprint," [online] AmIUnique.org, [retrieved Mar. 18, 2020], retrieved from the Internet: <https://amiunique.org/>, 6 pg.

Carlson, P., "Apache Lucene—Query Parser Syntax," [online] The Apache Software Foundation © 2006, Jun. 13, 2013, 7 pg.

Blei, D.M. et al., "Latent Dirichlet Allocation," Journal of Machine Learning Research, vol. 3, Jan. 2003, pp. 993-1022.

* cited by examiner

CROWDSOURCED REFINEMENT OF RESPONSES TO NETWORK QUERIES

BACKGROUND

This disclosure relates to data communications networks, and more particularly, to searching and retrieving information stored at various network sites.

Web browsers and similar software applications running on an ever-increasing array of network devices (e.g., desktop computers, laptops, tablets, and smartphones) enable a user to search and retrieve information from the vast array of information sources and systems that constitute the World Wide Web. A user can pose a question, convey the question over the Internet, and almost instantaneously receive multiple responses on almost any topic. More recent innovations such as chat groups, social networks, eCommerce websites, mobile apps, and other messaging platforms enable users to receive and send information through more focused or personalized interactions on various data communications networks.

SUMMARY

In one or more embodiments, a method can include detecting, with computer hardware, an insufficient answer to a query posed by a user seeking information from a plurality of networked sources communicatively coupled with an electronic communications network. The method also can include responding by determining demographic data corresponding to the user and initiating a search for a crowdsourced response to the query posed by the user. The search is conducted over the electronic communications network and is based on the demographic data corresponding to the user.

In one or more embodiments, a system includes a processor configured to initiate operations. The operations can include detecting an insufficient answer to a query posed by a user seeking information from a plurality of networked sources communicatively coupled with an electronic communications network. The operations also can include responding by determining demographic data corresponding to the user and initiating a search for a crowdsourced response to the query posed by the user. The search is conducted over the electronic communications network and is based on the demographic data corresponding to the user.

In one or more embodiments, a computer program product includes at least one non-transitory computer-readable storage medium having instructions stored thereon. The instructions are executable by a processor to initiate operations. The operations can include detecting an insufficient answer to a query posed by a user seeking information from a plurality of networked sources communicatively coupled with an electronic communications network. The operations also can include responding by determining demographic data corresponding to the user and initiating a search for a crowdsourced response to the query posed by the user. The search is conducted over the electronic communications network and is based on the demographic data corresponding to the user.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data communications networks, and more particularly, to searching and retrieving information stored at various network sites. A user of a network device can access a wealth of information by web browsing on the Internet or interacting with other users on a messaging platform. Nevertheless, the response to a user-posed query may fail to address the precise question posed or may lack the nuance or detail desired by the user.

In accordance with the inventive arrangements disclosed herein, if an answer to a query is likely insufficient, then a search for a crowdsourced response is initiated. As defined herein, an answer is "insufficient" if the answer causes the user to submit an additional query within a predefined time interval. For example, it is likely that the reason for the additional query is that a response to the initial query failed to provide the user with the information sought with sufficient clarity and, as a result, was insufficient. A "crowdsourced response," as defined herein, is an answer to a query that is based on multiple answers to the query, as provided by multiple individuals' responses to one or more polls.

One aspect of the arrangements disclosed herein, therefore, is the ability to determine that a browser-returned answer to a user's query is most probably inadequate. Although the adequacy of an answer is subjective in the mind of the user, the probabilistic determination of an answer's adequacy or inadequacy is machine generated in accordance with the arrangements disclosed herein.

Another aspect of the arrangements disclosed herein is the search for a refined response to the user's query that is tailored to be subjectively satisfactory to the user. Based on user identity, a search is performed for demographic data relating to the user. Personal interests, professional attributes, and the like are determined based on the demographic data culled from one or more network sources. A search for answers to polls that pose the same or similar questions as the user's query is made. The search focuses on obtaining answers from individuals that share similar demographic characteristics with the user. A crowdsourced response based on polling answers provided by individuals with similar characteristics is more likely to answer the user's query satisfactorily. If no such polling answers can be obtained, a new poll is automatically initiated that is directed to individuals identified as sharing similar demographic characteristics with the user.

The arrangements described herein are directed to computer technology and provide an improvement to computer technology. One improvement relates to the operative capacity of networked devices (e.g., desktop computers, laptops, tablets, and smartphones), as well as browsers, search engines, and messaging platforms (e.g., social networks). By automatically determining that an answer to a user query is most likely inadequate (subjectively in the mind of the user) and responding by generating a refined answer, the arrangements reduce or eliminate repetitive, and possibly unfruitful, searches by a user looking for better answers to an online query. Network traffic is reduced by avoiding numerous follow-on searches, thereby improving the performance of computer-based communications systems.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
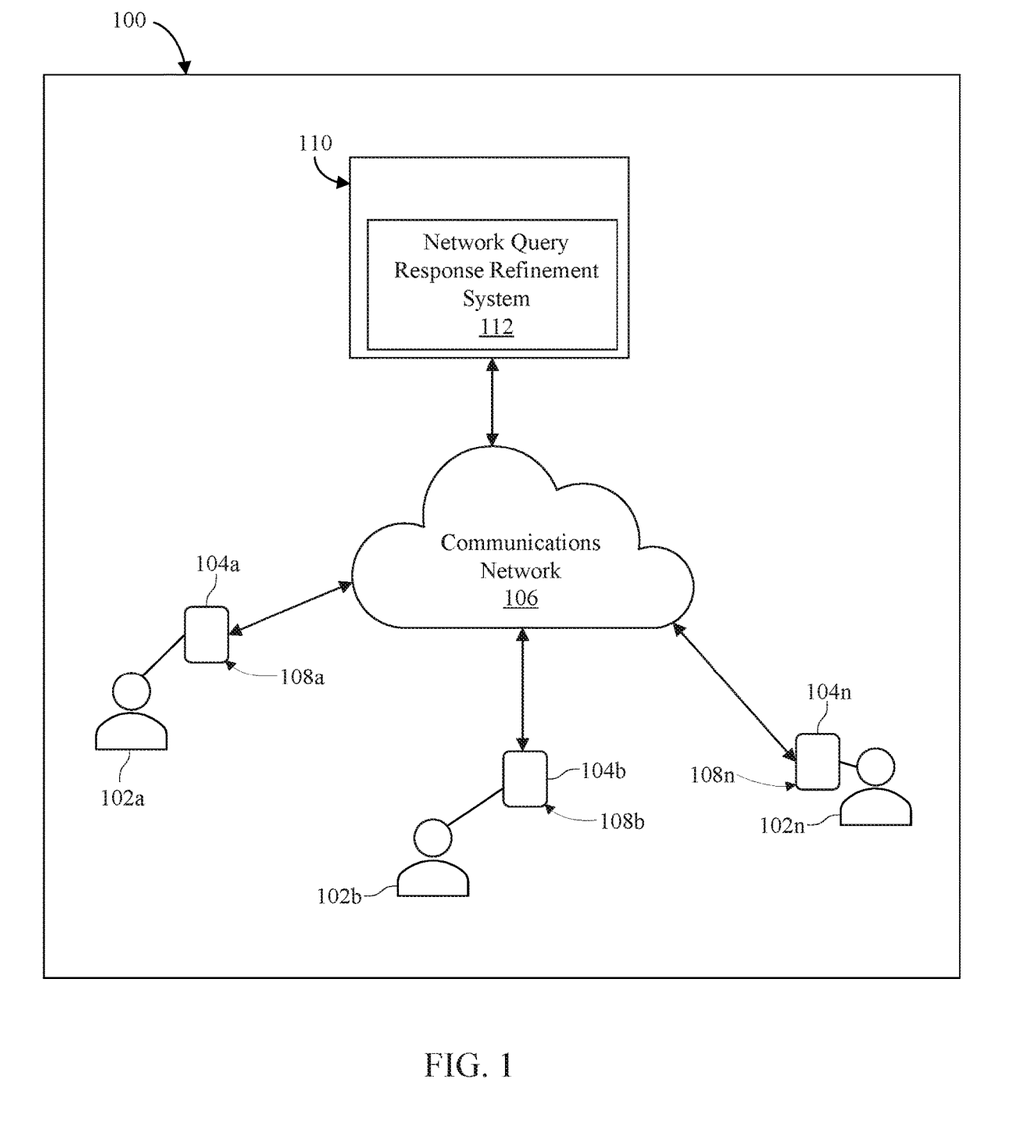
FIG. 1 depicts an example communication environment in which a network query response refinement system is operable according to an embodiment.

Referring initially to FIG. 1, example communication environment 100 is depicted in which one or more embodiments of a network query response refinement system is operable. Illustratively, example communication environment 100 includes multiple users 102*a*, 102*b*, and 102*n* who use electronic devices 104*a*, 104*b*, and 104*n*, respectively. Although only three such users and user devices are shown, it will be readily apparent that example communication environment 100 can include more or fewer users and user devices.

Electronic devices 104*a*-104*n* can comprise various types of electronic devices, including, for example, a computer (e.g., desktop, laptop, tablet computer), a smartphone or other mobile device, smart TV, or other communication/computing device. It will be appreciated that in various embodiments one or more of electronic devices 104*a*-104*n* can be deployed as a standalone device or deployed as multiple devices in a distributed client-server networked system. For example, in certain embodiments, a smartwatch can operatively couple to a mobile device (e.g., cell phone).

Illustratively, electronic devices 104*a*-104*n* communicatively couple with electronic communications network 106. Electronic communications network 106 provides communication links between various data processing systems and network sites (e.g., web sites on the Internet). Electronic communications network 106 can communicatively link users 102*a*-102*n* using electronic devices 104*a*-104*n* to various data communications network sites, including Internet sites. Communication links can include connections, such as wired communication links, wireless communication links, or fiber optic cables, and can be implemented as, or include, one or more (or any combination of) different communication technologies such as a wide area network (WAN), a local area network (LAN), a wireless network (e.g., a wireless WAN and/or a wireless LAN), a mobile or cellular network, a virtual private network (VPN), the Internet, and so forth.

As defined herein, "communication link" means a mode of communication using one or more electronic devices. A communication link is associated with a specific format and/or communication protocol for sending messages. For example, using a specific format and/or communication protocol, an electronic device can send a message to another electronic device as a text message, an email, a video call, a voice call, and/or a post to a social networking system or team collaboration platform. A communication link for exchanging text messages is considered a distinct communication link. Likewise, a communication link for exchanging emails is a distinct communication link, as is a communication link for video calls and a communication link for voice calls. So, too, a communication link used for posting to a social networking system or team collaboration platform is considered a distinct communication link. Accordingly, each type of communication link corresponding to a different type or mode of communication is considered a distinct communication link.

Electronic devices 104*a*-104*n* are endowed with processing capabilities and/or circuitry 108*a*, 108*b*, and 108, respectively, which enable electronic devices 104*a*-104*n* to search for and retrieve information from web sites, collaboration networks, social networks, and the like via electronic communications network 106. One or more of electronic devices 104*a*-104*n* can include a network query response refinement system, integrated in or operatively coupled with processing capabilities and/or circuitry 108*a*-108*n*. Alternatively, one or more of electronic devices 104*a*-104*n* can link via electronic communications network 106 (e.g., the Internet) to server 110 (or other networked site) that hosts a network query response refinement system 112.

Figure 2:
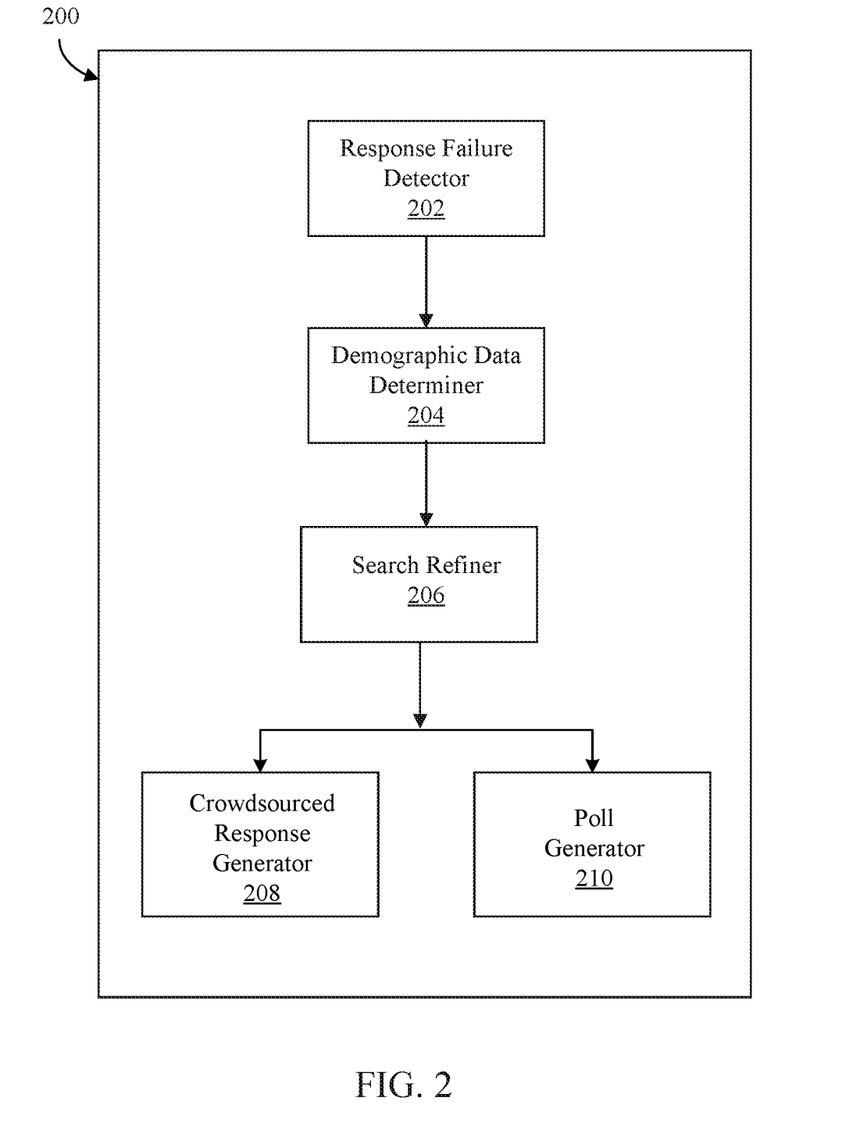
FIG. 2 depicts an example network query response refinement system according to an embodiment.

Referring now to FIG. 2, system 200 is an example network query response refinement system according to one embodiment. System 200 illustratively comprises response failure detector 202, demographic data determiner 204, search refiner 206, crowdsourced response generator 208, and poll generator 210. Response failure detector 202, demographic data determiner 204, search refiner 206, crowdsourced response generator 208, and poll generator 210, in certain embodiments, are implemented in processor-executable instructions that run on one or more processors of an electronic device, such as processor(s) 616 of computer system 612 (e.g., server, desktop, laptop, tablet) of computing node 600 described with reference to FIG. 6.

For a user seeking information from a plurality of networked sources communicatively coupled with an electronic communications network, response failure detector 202 detects an insufficient answer to a query posed by the user using an electronic communications device. Response failure detector 202, in certain embodiments, detects an insufficient answer by detecting the user conveying a query within a predetermined time (e.g., n seconds) after having conveyed a similar query over the electronic communications network within a predefined time interval (e.g., n seconds). As defined herein, a query is "similar" to another query if both queries share certain identifiable attributes. The attributes can be equivalent and/or related concepts or topics evinced by the text of the queries. The attributes can be the appearance of the same and/or similar words and/or phrases in the text of both queries.

In some embodiments, response failure detector 202 identifies similar concepts, topics, phrases, and/or words in separate queries based on concept labeling through natural language processing (NLP) performed by a natural language classifier (e.g., Watson™ Natural Language Classifier). The natural language classifier can implement one or more classification models (e.g., support vector machine, convolutional neural network, decision tree, Latent Dirichlet allocation). One or more classification models may be generated through unsupervised and/or supervised learning to achieve a desired level of accuracy for determining similarity.

If an initial query is followed within a predetermined time interval by a similar query, response failure detector 202 detects that the answer provided (e.g., by web browser) is insufficient. As a result, demographic data determiner 204 responds by searching for and retrieving demographic data pertaining to the user. Search refiner 206 initiates a search for a crowdsourced response to the query posed by the user. The search initiated is a search for answers to polls in which the answers are provided by individuals who share similar demographic characteristics with the user.

For example, a user Alice, who is an avid soccer fan, may engage in a debate over who the best soccer player is and initiate an Internet-based query, "who is the best soccer player"? When Alice fails to receive a satisfactory answer, she conveys another query. If the subsequent query is similar to the previous one and is conveyed within a specified time interval, response failure detector 202 detects the likelihood of a failure to provide Alice a satisfactory answer. The failure, when detected, prompts demographic data determiner 204 to determine demographic data regarding Alice. The following depicts an example lookup table that system 200 generates in response to Alice's initial failure to receive a satisfactory answer:

| Search Terms | User Identity | Date |
|---|---|---|
| Who is the greatest FIFA Star? | Alice | March 22 06:10 PM |
| Who is the great FIFA Star from world cup play? | Alice | March 22 06:11 PM |

Illustratively, the first column of the lookup table logs the initial and the follow-on queries, the second identifies the user (Alice), and the third records the date and times of the respective queries. In various embodiments, and with Alice's consent and pre-authorization, demographic data determiner 204 searches for and captures various demographic data pertaining to Alice.

In general, the identity and corresponding demographic data of a user, can be gathered from various sources. For example, a profile corresponding to the user's search engine can identify the user and provide various elements of demographic data. The IP address of the user device can indicate the user's geolocation. Network provider information and browser elements (e.g., a trackable device fingerprint) likewise can provide relevant information as to user identity and demographic characteristics. In some embodiments, demographic data determiner 204 can identity a user based on an enterprise directory such as the Lightweight Directory Access Protocol (LDAP) or through an enterprise organization chart. The user, in some instances, may permit the accessing of relevant data by demographic data determiner 204 from a social network to which the user belongs and/or another site (e.g., professional membership site) that provides demographic data. Demographic data can include the user's connections to others (community members) through various social, work-related, and/or professional networks.

System 200 can generate an analytical table populated by demographic data pertaining to the user. For example, the following analytical table can be generated for Alice, based on Alice's queries regarding the best soccer player:

| Search Terms | User Identity | Date | Demographics |
|---|---|---|---|
| Who is the greatest FIFA Star? | Alice | 22-MAR-2019 06:10 PM | Apple iOS 11, Community Member Connections, Other Data |
| Who is the great FIFA Star from world cup play? | Alice | 22-MAR-2019 06:11 PM | Apple iOS 11, Community Member Connections, Other Data |

The various demographic data (fourth column) can specify the user's (Alice's) device, connections (social and/or professional) with others, and various other data (e.g., geographic location) such as that described above. Optionally, demographic data can be modified by the user. User-supplied modifications can be based on and reflect aspects of the user, such as preferences, opinions, perceptions, and the like. The demographic data is used by search refiner 206 to initiate the search for a crowdsourced response to a query. The search for a crowdsourced response focuses on identifying and retrieving polling answers provided by individuals who share similar demographic characteristics with the user.

Search refiner 206 generates one or more search refined queries. A refined search query uses terms that are the same or similar—determined, for example, by the natural language classifier described above—to ones used in the prior queries. Search refiner 206 conjoins the terms with ones extracted from the demographic data corresponding to the user. The search for polling data can encompass various sources, depending on the nature of the query and the demographic characteristics of the user. Sources of polling data include, for example, SurveyMonkey®, Doodle™ polls, ESPN® polls, Facebook® polls, Slack® Polls, various news polls, and polls from various social networks, and various other sources.

The search yields results (answers to a query) determined based on the user's specific demographic characteristics. For example, with respect to Alice, the data can indicate that based on age and location, Alice is interested in soccer players from a specific era and from specific countries. Based on Alice's demographic data, a refined search can result in a retrieval of polls from which the following results (column three) are culled:

| Subject | Demographic Criteria | Results |
|---|---|---|
| FIFA: All Time Best Soccer Team. Soccer | age 18-35 software engineer New England likes Soccer | Pele Zidane Kane Madric |
| ESPN: The 2010s best team | alive in 2000s connected to Sam Likes Soccer | France Spain Russia England Argentina |

Crowdsourced response generator 208 can select results for presentment to the user based on a maximum subset overlap of the criteria (e.g., the top n poll results according to each criterion) or present the results in their entirety. The user can select one or more of the results as the answer sought. The process can be further refined and repeated using terms or additional context revealed by the initial results.

Poll generator 210 operates if a search fails to yield any poll results. Poll generator 210 constructs a poll whose aggregated answers provide a crowdsourced response to a user's query. Poll generator 210 constructs the poll by aggregating one or more search terms of one or more prior queries. Poll generator 210 conveys the poll via a data communication network to one or more individuals identified as having demographic characteristics the same or similar to the user.

Optionally, with the consent of the individual users, different network query response refinement systems used by multiple users can be integrated. Similar searches and other user's demographic data can then be used by poll generator 210 in constructing a poll. Poll generator 210 can identify frequently occurring terms in prior searches by other users and can incorporate the frequently occurring terms in constructing the poll. For example, poll generator 210 can perform a document frequency filter and select the n most frequent terms to include in the poll. Poll generator can use k-means clustering or similar technique for identifying similar terms used in several different searches.

System 200 can distribute the poll constructed by poll generator 210 to individuals identified with the user, such as members of a chat group or social network to which the user belongs. Based on the number of responses received, system 200 can determine the statistical significance of the results and report the results and corresponding statistical significance to the user.

Figure 3:
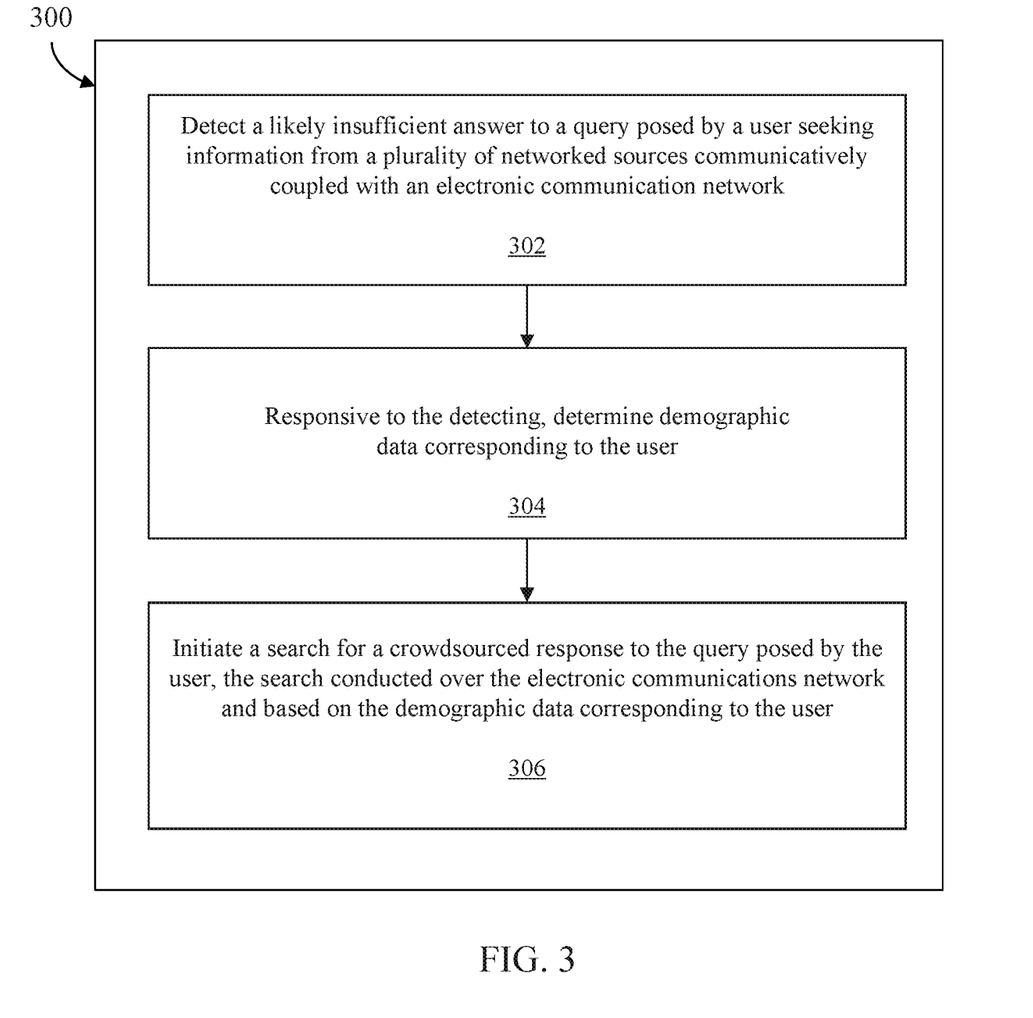
FIG. 3 is a flowchart of a method for refining responses to network queries according to an embodiment.

Referring now to FIG. 3, a flowchart of method 300 for refining responses to network queries according to an embodiment is shown. Method 300 can be performed with a system the same or similar to the system described with reference to FIGS. 1 and 2. At block 302, the system detects a likely insufficient answer to a query, the query posed by a user seeking information from a plurality of networked sources communicatively coupled with an electronic communications network. Responsive to the detecting, the system at block 304 determines demographic data corresponding to the user. At block 306, the system initiates a search for a crowdsourced response to the query posed by the user, the search to be conducted over the electronic communications network and based on the demographic data corresponding to the user.

The system, in some embodiments, detects that the answer is likely insufficient based on detecting a similarity between the query and a prior query conveyed over the electronic communications network and by determining that a time lapse between conveyance of the query and conveyance of the prior query is within a predetermined time interval. The predefined similarity can be determined by the system based on identifying a topic and/or word pattern that is common to both the query and the prior query. In certain embodiments, similarity is determined by a natural language classifier.

The system, in some embodiments, determines demographic data corresponding to the user by identifying the user (e.g., based on an attribute of the user's device) and based on the user identity determined by collecting the demographic data from at least one networked source (e.g., social network site to which the user belongs). Optionally, the system modifies the demographic data in response to one or more user inputs. The user inputs can express or otherwise correspond to a preference and/or perception of the user.

In the event that the search for a crowdsourced response fails to yield any result, the system can generate a poll that seeks the information sought with the user's query. The system conveys the poll to one or more potential responders whom the system identifies based on demographic data corresponding to the user and the potential responders. Poll responses from responders who share similar demographic characteristics with the user are likely to provide responses that most directly answer the user's query. Given multiple systems used by multiple users who agree to integrate the results generated by their respective systems, the system can identify prior searches submitted by searchers who share similar demographic characteristics with the user. The system can cull search terms from the prior searches in constructing a new search.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
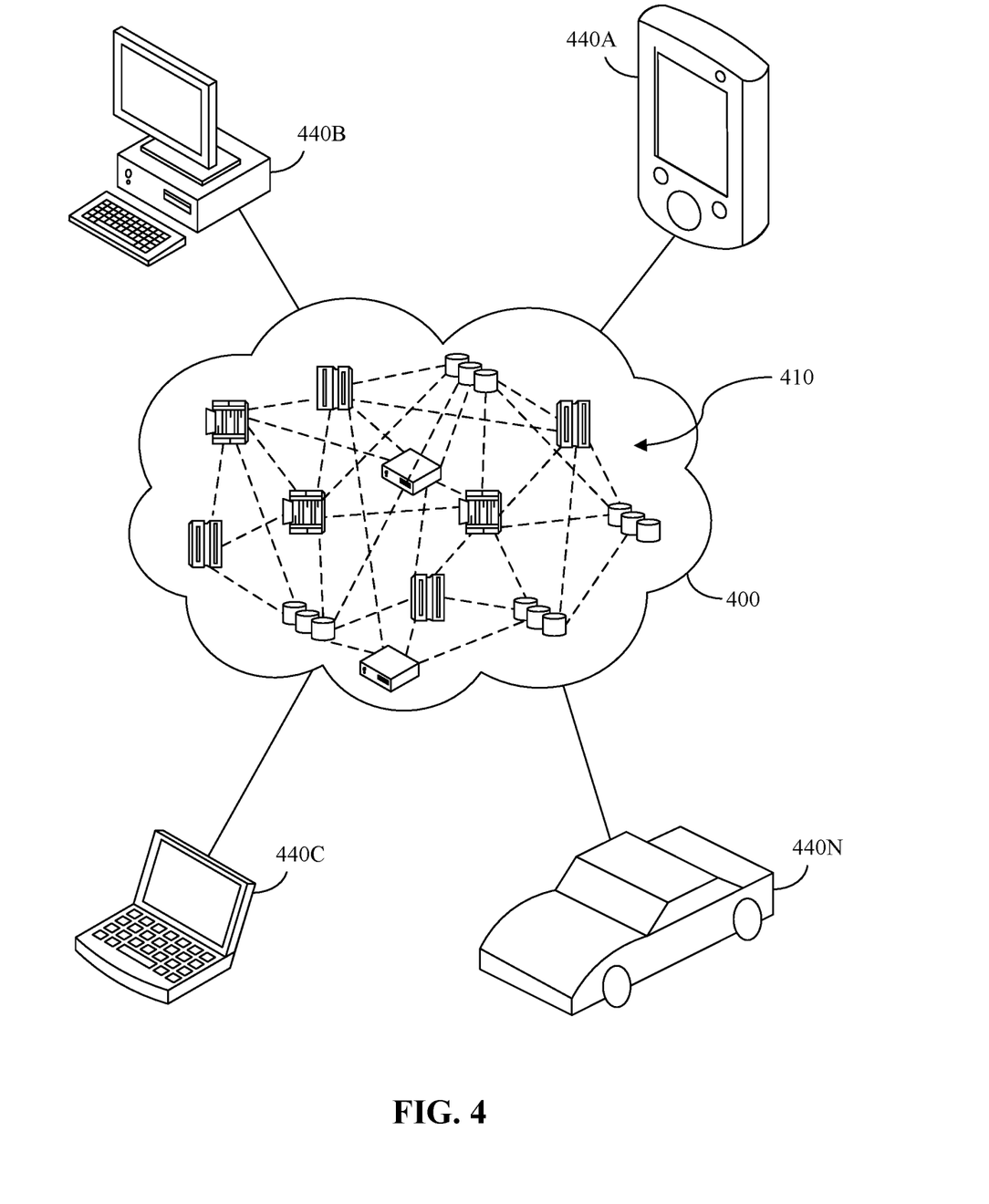
FIG. 4 depicts a cloud computing environment according to an embodiment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 44a-n shown in FIG. 4 are intended to be illustrative only and that computing nodes 410 and cloud computing environment 400 can communicate with any type of computerized device over any type of network and/or network addressable connection (e.g., using a web browser).

Figure 5:
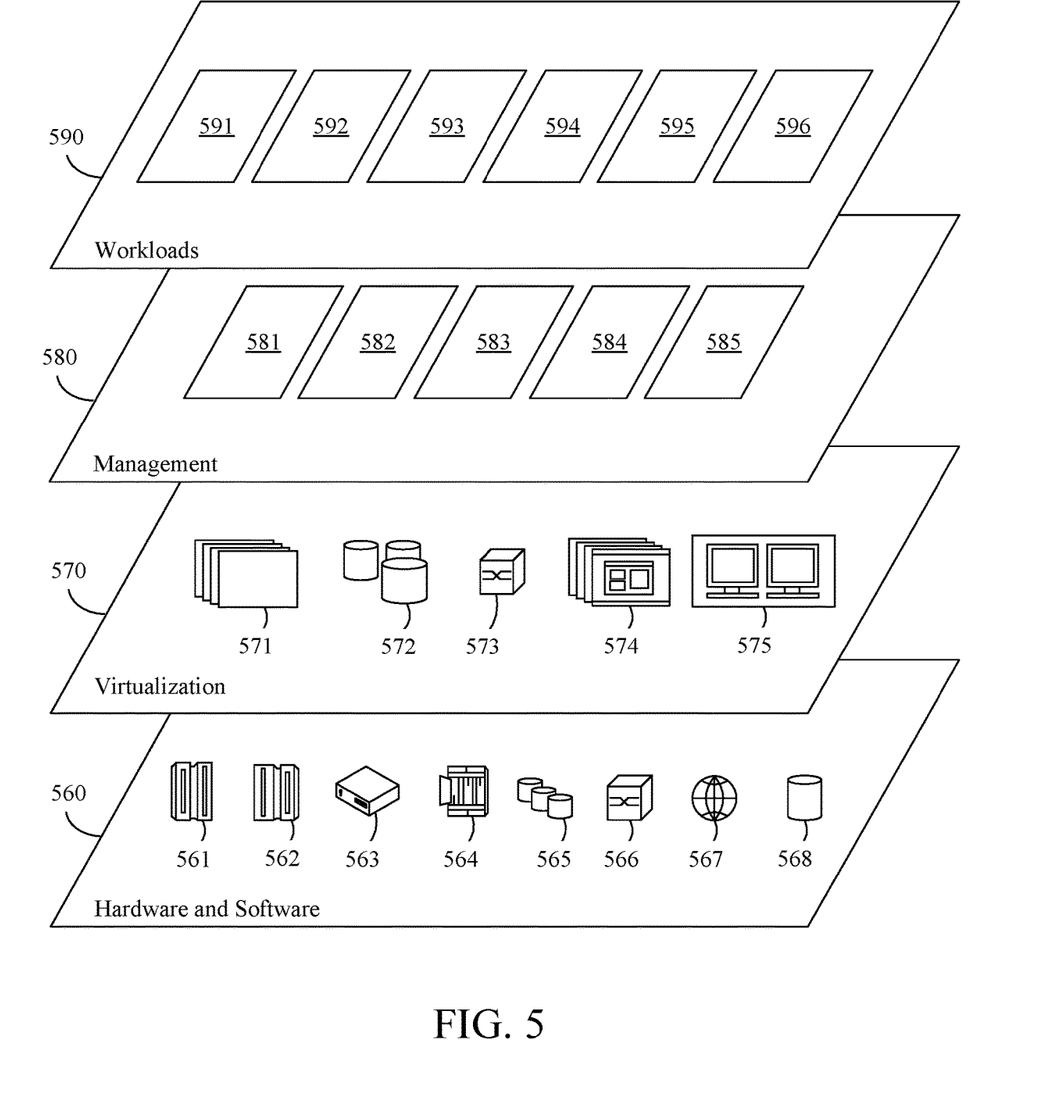
FIG. 5 depicts abstraction model layers according to an embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA. Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and network query response refinement system 596.

Figure 6:
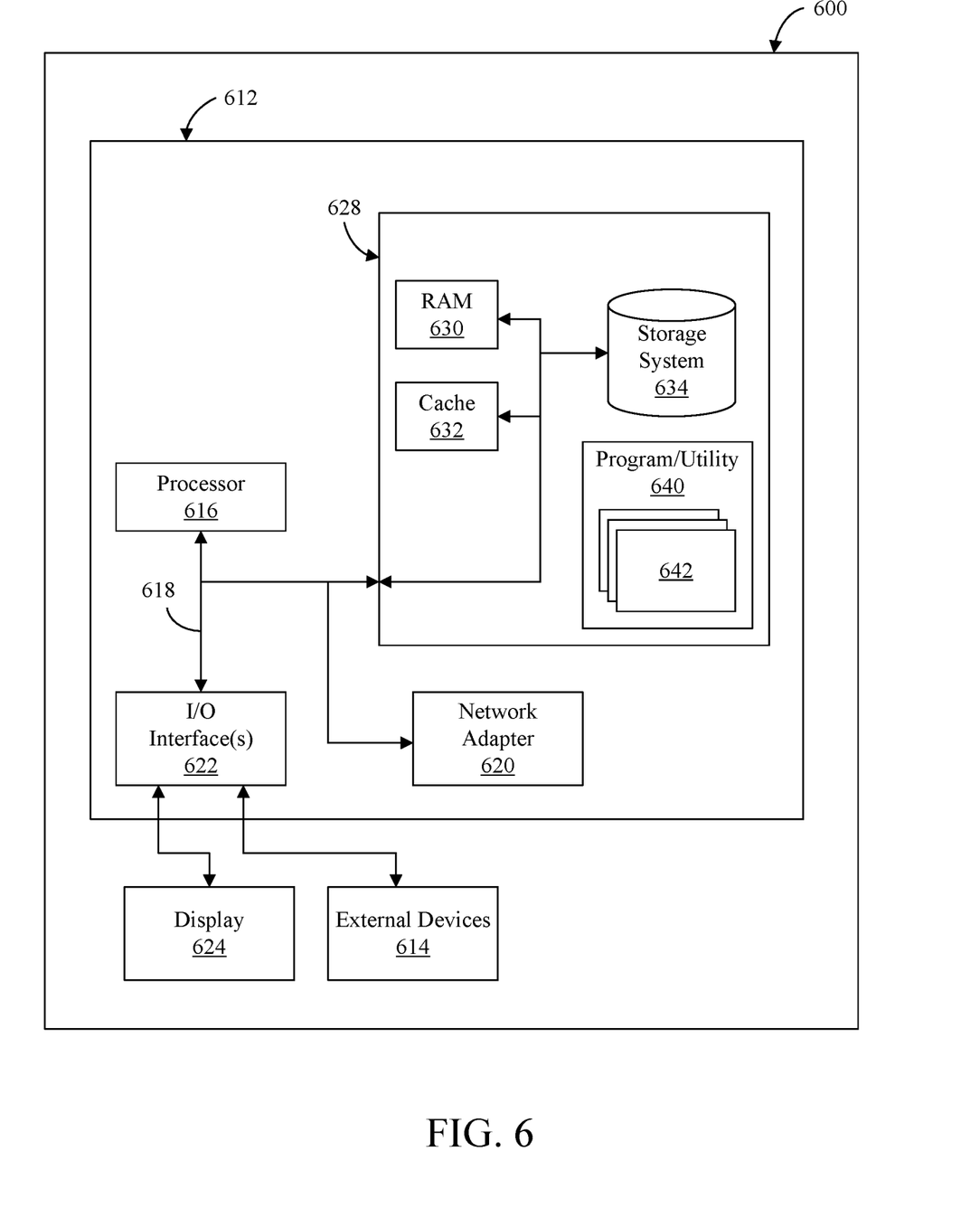
FIG. 6 depicts a cloud computing node according to an embodiment.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include network query response refinement system 696 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" means responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" refer to human beings. Likewise, as defined herein "users" and "individuals" refer to human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
detecting, with computer hardware, an insufficient answer to a query posed by a user seeking information from a plurality of networked sources communicatively coupled with an electronic communications network, the detecting the insufficient answer to the query comprising detecting a similarity between the query and a prior query conveyed over the electronic communications network and determining that a time lapse between conveyance of the query and conveyance of the prior query is within a predetermined time interval;
responsive to the detecting, determining demographic data corresponding to the user; and
initiating a search for a crowdsourced response to the query posed by the user, the search conducted over the electronic communications network and based on the demographic data corresponding to the user.

2. The method of claim 1, wherein the similarity is predefined and the similarity is based on identifying at least one of a topic or word pattern that is common to both the query and the prior query.

3. The method of claim 1, wherein the determining comprises identifying the user and based on the identifying collecting the demographic data from at least one networked source.

4. The method of claim 1, further comprising modifying the demographic data in response to one or more user inputs corresponding to a preference of the user.

5. The method of claim 1, further comprising generating a poll in response to failing to obtain any response to the search for a crowdsourced response and conveying the poll to a plurality of potential responders based on demographic data corresponding to the user and the potential responders.

6. The method of claim 1, wherein the generating comprises identifying prior searches submitted by searchers who share similar demographic characteristics with the user.

7. A system, comprising:
a processor configured to initiate operations including:
  detecting an insufficient answer to a query posed by a user seeking information from a plurality of networked sources communicatively coupled with an electronic communications network, the detecting the insufficient answer to the query comprising detecting a similarity between the query and a prior query conveyed over the electronic communications network and determining that a time lapse between conveyance of the query and conveyance of the prior query is within a predetermined time interval;
  responsive to the detecting, determining demographic data corresponding to the user; and
  initiating a search for a crowdsourced response to the query posed by the user, the search conducted over the electronic communications network and based on the demographic data corresponding to the user.

8. The system of claim 7, wherein the similarity is predefined and the similarity is based on identifying at least one of a topic or word pattern that is common to both the query and the prior query.

9. The system of claim 7, wherein the determining comprises identifying the user and based on the identifying collecting the demographic data from at least one networked source.

10. The system of claim 7, wherein the processor is configured to initiate operations further comprising modifying the demographic data in response to one or more user inputs corresponding to a preference of the user.

11. The system of claim 7, wherein the processor is configured to initiate operations further comprising generating a poll in response to failing to obtain any response to the search for a crowdsourced response and conveying the poll to a plurality of potential responders based on demographic data corresponding to the user and the potential responders.

12. A computer program product, the computer program product comprising:
  one or more non-transitory computer-readable storage media and program instructions collectively stored on the one or more non-transitory computer-readable storage media, the program instructions executable by a processor to cause the processor to initiate operations including:
    detecting an insufficient answer to a query posed by a user seeking information from a plurality of networked sources communicatively coupled with an electronic communications network, the detecting the insufficient answer to the query comprising detecting a similarity between the query and a prior query conveyed over the electronic communications network and determining that a time lapse between conveyance of the query and conveyance of the prior query is within a predetermined time interval;
    responsive to the detecting, determining demographic data corresponding to the user; and
    initiating a search for a crowdsourced response to the query posed by the user, the search conducted over the electronic communications network and based on the demographic data corresponding to the user.

13. The computer program product of claim 12, wherein the similarity is predefined and the similarity is based on identifying at least one of a topic or word pattern that is common to both the query and the prior query.

14. The computer program product of claim 12, wherein the determining comprises identifying the user and based on the identifying collecting the demographic data from at least one networked source.

15. The computer program product of claim 12, wherein the program instructions are executable by the processor to cause the processor to initiate operations further comprising modifying the demographic data in response to one or more user inputs corresponding to a preference of the user.

16. The computer program product of claim 12, wherein the program instructions are executable by the processor to cause the processor to initiate operations further comprising generating a poll in response to failing to obtain any response to the search for a crowdsourced response and conveying the poll to a plurality of potential responders based on demographic data corresponding to the user and the potential responders.

17. The computer program product of claim 12, wherein the generating comprises identifying prior searches submitted by searchers who share similar demographic characteristics with the user.

\* \* \* \* \*